(12) United States Patent
Silverwood et al.

(10) Patent No.: US 11,427,329 B2
(45) Date of Patent: Aug. 30, 2022

(54) MOUNTING STRUCTURE AND ARRANGEMENT

(71) Applicant: Safran Seats GB Limited, Cwmbran (GB)

(72) Inventors: Neal Silverwood, Cwmbran (GB); Clive Pearce, Cwmbran (GB)

(73) Assignee: Safran Seats GB Limited, Cwmbran (GB)

( * ) Notice: Subject to any disclaimer, the term of this patent is extended or adjusted under 35 U.S.C. 154(b) by 0 days.

(21) Appl. No.: 16/670,041

(22) Filed: Oct. 31, 2019

(65) Prior Publication Data

US 2020/0140092 A1    May 7, 2020

(30) Foreign Application Priority Data

Nov. 2, 2018  (GB) .................................... 1817977

(51) Int. Cl.
*F16M 11/00*    (2006.01)
*B64D 11/06*    (2006.01)

(52) U.S. Cl.
CPC ................. *B64D 11/0696* (2013.01)

(58) Field of Classification Search
CPC ............................ B64D 11/0696; B64D 11/06
See application file for complete search history.

(56) References Cited

U.S. PATENT DOCUMENTS

| | | | |
|---|---|---|---|
| 3,620,171 A | 11/1971 | Brenia et al. | |
| 4,913,489 A | 4/1990 | Martin | |
| 5,954,401 A * | 9/1999 | Koch | B64D 11/0638 |
| | | | 297/354.13 |
| 6,260,813 B1 * | 7/2001 | Whitcomb | B64D 11/0696 |
| | | | 244/118.6 |
| 9,403,597 B2 * | 8/2016 | Ferry | B64D 11/0601 |
| 10,583,926 B2 * | 3/2020 | Erhel | B60N 2/14 |
| 10,829,225 B2 * | 11/2020 | Doughty | B60N 2/01516 |
| 11,034,263 B2 * | 6/2021 | Gross | B64D 11/0696 |
| 2006/0249616 A1 | 11/2006 | Frantz et al. | |
| 2010/0096502 A1 | 4/2010 | VanderWolk | |

FOREIGN PATENT DOCUMENTS

| | | |
|---|---|---|
| EP | 3296206 A1 | 3/2018 |
| GB | 2219493 | 12/1989 |

OTHER PUBLICATIONS

United Kingdom Patent Application No. 1817977.0, Combined Search and Examination Report, dated May 1, 2019, 7 pages.
Europe Patent Application No. 19205933.5, Extended European Search Report, dated Apr. 14, 2020.

* cited by examiner

*Primary Examiner* — Amy J. Sterling
(74) *Attorney, Agent, or Firm* — Kilpatrick Townsend & Stockton LLP

(57) ABSTRACT

The present invention concerns a mounting structure and arrangement. More particularly, but not exclusively, this invention concerns a mounting structure and arrangement for mounting aircraft furniture in an aircraft. The mounting structure comprises a first connection assembly configured for engagement with a first mounting track; and an associated first support. The first support is configured to abut the first mounting track at a location fore or aft of the first connection assembly. The provision of the support may reduce the number of connection assemblies required to properly secure an item of aircraft furniture in an aircraft cabin using the mounting structure.

14 Claims, 5 Drawing Sheets

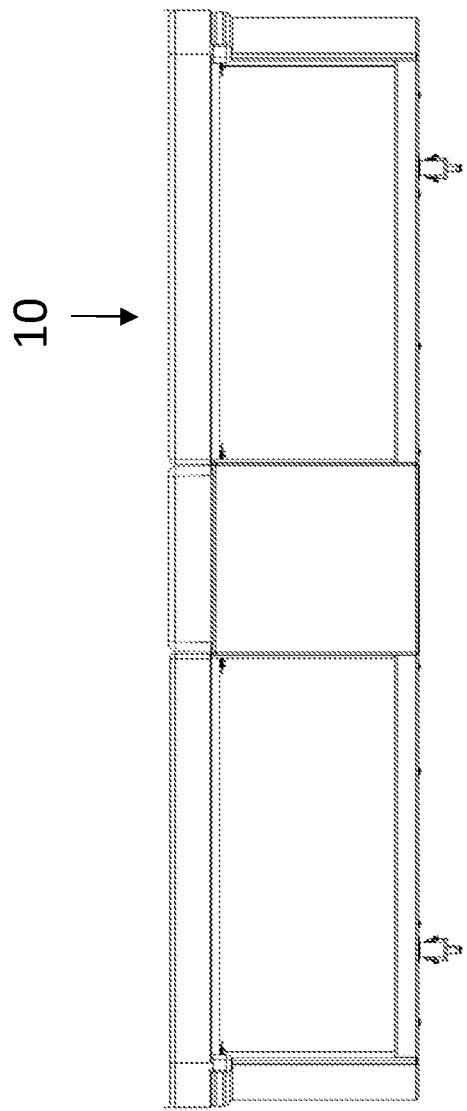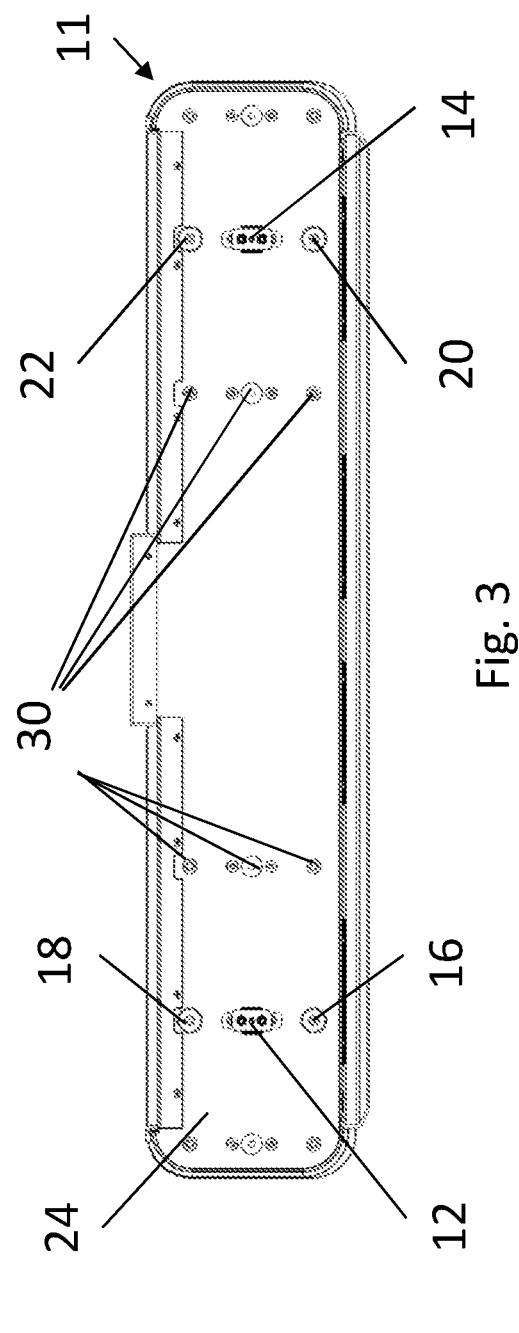

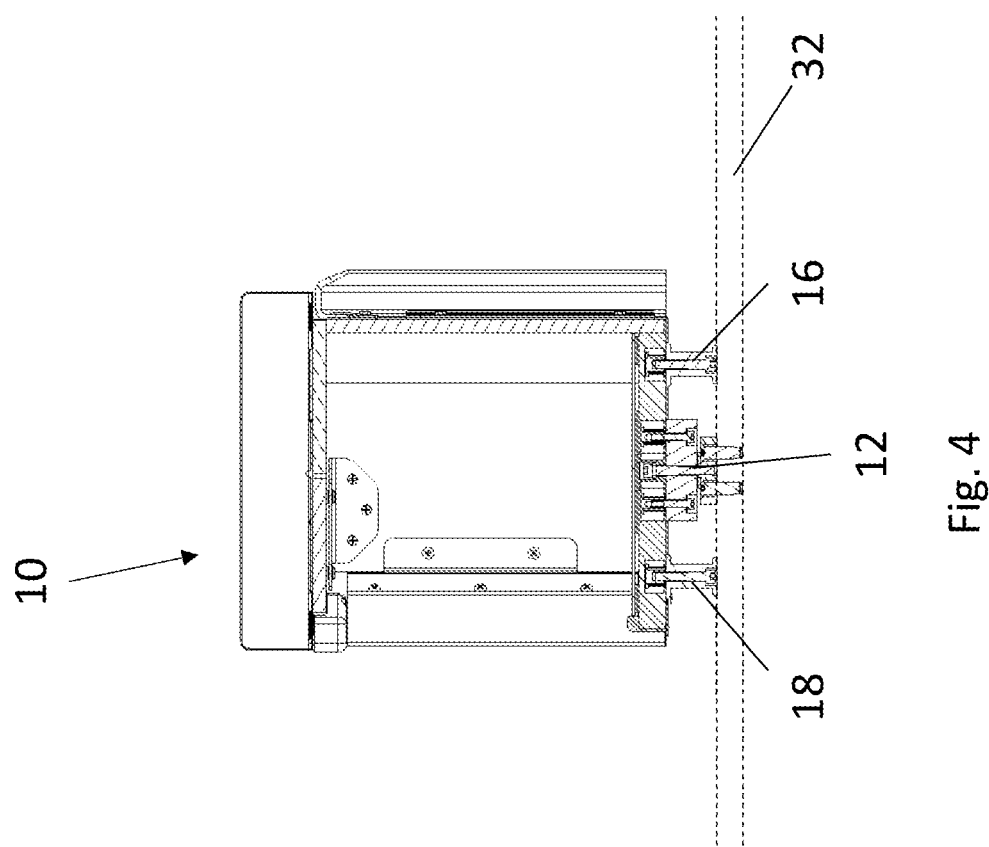

MOUNTING STRUCTURE AND ARRANGEMENT

CROSS-REFERENCE TO RELATED APPLICATIONS

This application is related to and claims priority benefits from United Kingdom Patent Application No. 1817977.0, filed on Nov. 2, 2018, entitled "Mounting Structure and Arrangement," the entire contents of which is incorporated herewith by reference.

FIELD OF THE INVENTION

The present invention concerns a mounting structure and arrangement. More particularly, but not exclusively, this invention concerns a mounting structure and arrangement for mounting aircraft furniture in an aircraft.

BACKGROUND OF THE INVENTION

Aircraft furniture, for example aircraft seats and ottomans, are usually mounted to the floor of an aircraft by engagement of at least four foot fittings (also known as connection assemblies), which extend from the base of the aircraft furniture, into mounting tracks which run along the length of the aircraft. The mounting tracks usually run parallel to the line of flight of the aircraft, and it is common to mount furniture to a set of two parallel tracks. The mounting tracks typically have apertures into which the foot fittings are inserted and engaged with, such that the foot fittings may remain in place in up to a 9G load situation. Different aircraft, for example, provided by different aircraft manufacturers, use different mounting tracks, with correspondingly different foot fittings for insertion into and engagement with the mounting tracks. It is common that the manufacturer of the aircraft furniture has to purchase the suitable foot fittings and mount them on the aircraft furniture prior to the furniture being installed in the aircraft. In the case of a typical ottoman, there will be a first pair of foot fittings for engagement with a first mounting track, and a second pair of foot fittings for engagement with a second, parallel, mounting track. The provision of four foot fittings may increase the cost of the aircraft furniture, and also increase the installation time for the aircraft furniture.

The present invention seeks to mitigate the above-mentioned problems. Alternatively or additionally, the present invention seeks to provide an improved aircraft mounting structure.

SUMMARY OF THE INVENTION

The present invention provides, according to a first aspect, a mounting structure for mounting an item of aircraft furniture in an aircraft, the mounting structure comprising a first connection assembly configured for engagement with a first mounting track; and an associated first support, the first support configured to abut the first mounting track at a location fore or aft of the first connection assembly.

Advantageously, the provision of a support associated with the first connection assembly may allow a reduction in the number of connection assemblies required to securely fasten an item of aircraft furniture in an aircraft. Such an arrangement may reduce the costs of the mounting structure, and also may reduce the installation time of the item of aircraft furniture. In particular, the provision of a support which abuts the mounting track but does not require installation/engagement with the mounting track may enable the single connection assembly to meet the required load bearing requirements which would usually require the provision of, and installation of, at least two connection assemblies. Typically, a mounting track will comprise a series of apertures into which a connection assembly is inserted and engaged with. The first support may be arranged to abut the mounting track such that it is not inserted into the connection aperture, for example, sitting on top of the connection aperture.

The mounting structure may comprise a second connection assembly configured for connection with a second mounting track; and an associated second support, the second support configured to abut the second mounting track at a location fore or aft of the second connection assembly.

Preferably, there is only a single connection assembly configured for connection with the first mounting track and a single connection assembly configured for connection with the second mounting track. Therefore, the number of connection assemblies required to mount an item of aircraft furniture in an aircraft may be reduced in comparison to prior art arrangements where at least two connections assemblies are provided for each mounting track to which the aircraft furniture is mounted.

The skilled person will realise there may be a third connection assembly and associated support or supports, the third connection assembly configured for engagement with a third mounting track, and the associated support or supports configured to abut the third mounting track at positions fore or aft of the connection assembly. Similarly, there may be fourth, fifth, etc. connection assemblies and associated supports, and fourth, fifth, etc. mounting tracks depending on the size of the aircraft furniture which is to be mounted in an aircraft.

The first mounting track and second mounting track may run in parallel directions. The first mounting track and second mounting track may run along the line of flight of the aircraft. The first mounting track and second mounting track may run from the front to the rear of an aircraft, parallel to the longitudinal axis of the aircraft.

The first connection assembly may be associated with a third support, the first support configured to abut the first mounting track at a location fore of the first connection assembly and the third support configured to abut the first mounting track at a location aft of the first connection assembly. The association of the first connection assembly with a third support does not imply that there are three supports associated with the first connection assembly. Instead, as will be appreciated by the skilled person, the use of the word "third" is in the context of a first connection assembly and second connection assembly being provided. Where only a single connection assembly is provided, a first support and third support covers the provision of just two supports.

The second connection assembly may be associated with a fourth support, the second support configured to abut the second mounting track at a location fore of the second connection assembly and the fourth support configured to abut the second mounting track at a location aft of the second connection assembly.

The aircraft furniture may be oriented in line with the aircraft, for example, an aircraft seat being aligned with the longitudinal axis of the aircraft. In such an arrangement, the first connection assembly and second connection assembly, and respectively the first support and second support, and potentially third support and fourth support, may be aligned with each other in a perpendicular direction. In an alternative arrangement, where there is a first connection assembly and second connection assembly, and respective first support and second support, the first connection assembly may be arranged to the fore of the aircraft furniture, with the associated first support located to the aft of the aircraft furniture, and the second connection assembly may be arranged to the aft of the aircraft furniture, with the associated second support located to the fore of the aircraft furniture. In a yet further alternative arrangement, the aircraft furniture may be in a herringbone arrangement, whereby the first connection assembly, second connection assembly, and associated supports are engaged with, or abutting, as appropriate, parallel mounting tracks. The parallel mounting tracks may be oriented parallel to the longitudinal axis of the aircraft. The first connection assembly, second connection assembly, and associated supports may be angled at an angle approximately equal to the angle of the herringbone arrangement.

When the first support and second support are located fore of the respective first connection assembly and second connection assembly, and the third support and fourth support are located aft of the respective first connection assembly and second connection assembly, the first support and second support are only loaded in compression (i.e. typically when the aircraft decelerates) and the third support and fourth support are only loaded in compression (i.e. typically when the aircraft accelerates), and there is no need to engage the supports with the mounting tracks. The supports may comprise a distal end which is configured to abut the mounting track, the distal end shaped and sized such that it may not pass through any of the connection apertures of the mounting track.

Only the connection assemblies experience tension loads, and therefore require engagement with the mounting track. The relative position of a connection assembly with respect to the fore and aft supports may be such that the connection assembly is midway between the fore and aft supports, or more closely positioned to one of the fore or aft supports. For example, due to the uneven nature of forces on an item of aircraft furniture, it may be mechanically advantageous to locate the connection assembly closer to the aft support than the fore support.

The supports may comprise metal and/or polymer materials. For example, the supports may comprise aluminium or nylon. The fore or aft position of the supports may result in different loads being experienced by the supports. Therefore, if the first support and second support are located fore of their respective connection assemblies, they may be of different structure, or made of different materials, to the third support and fourth support located aft of the connection assemblies. For example, the fore supports may experience greater loads than the aft supports in an extreme deceleration event such as an emergency landing, and as such be made stronger than the aft supports.

The distance between a connection assembly and an associate support may range between 75 mm and 150 mm. The distance between the first connection assembly and second connection assembly may range from 250 mm to 1250 mm. The distance between the first connection assembly and second connection assembly will be determined by the distance between the mounting tracks.

The mounting structure may comprise a plate or framework from which the connection assembly/assemblies and support/supports extend. The plate or framework may comprise a metal or composite structure. For example, a plate may comprise a honeycomb core with a skin on either side of the core. The plate may comprise a plurality of apertures and engagement points from which the connection assemblies and supports may extend, thereby allowing for a single plate to be adaptable to a number of different track widths, by the appropriate positioning of the connection assemblies and associated supports.

A connection assembly may comprise a first part configured to be engaged with the mounting track, and a second part configured to adapt the first part for connection to the mounting structure. For example, the first part may be a standard foot connector as specified by an aircraft manufacturer, and the second part may be an adaptor configured to allow the standard foot connector to be mounted to the connection assembly. Advantageously, such an arrangement may allow the same mounting structure to be used across a variety of aircraft whilst requiring only the connection assembly arrangement to be changed. Alternatively, a connection assembly may comprise a single part configured to be engaged with the mounting track and also configured for connection to the mounting structure. The mountings used in the connection assemblies to the mounting tracks may be airline, or airline manufacturer specific, and are well known to the person skilled in the art. Therefore, the exact arrangement of the potential connection assemblies need not be described any further.

The mounting structure may be associated with, or form part of, an item of aircraft furniture. For example, the mounting structure may comprise a plate or framework connected to the base of an item of aircraft furniture. The item of aircraft furniture may be an aircraft seat or an ottoman.

According to a second aspect of the invention, there is provided an item of aircraft furniture, the aircraft furniture comprising a mounting structure according to the first aspect of the invention. The aircraft furniture may comprise an ottoman or an aircraft seat.

According to a third aspect of the invention, there is provided an aircraft cabin comprising aircraft furniture as described with reference to the second aspect of the invention.

According to a fourth aspect, the invention provides a method of installing an item of aircraft furniture, the aircraft furniture comprising a mounting structure according to the first aspect of the invention, the method comprising the steps of engaging the connection assembly with a mounting track of the aircraft, such that the first support abuts the mounting track.

According to a fifth aspect, the invention provides a mounting structure for mounting an item of aircraft furniture in an aircraft, the mounting structure comprising a first connection assembly configured for engagement with a first mounting track; and an associated first support, the first support located fore or aft of the first connection assembly.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which:

FIG. 2 shows front view of the ottoman of FIG. 1;

FIG. 3 shows a base view of the ottoman of FIG. 1;

FIG. 4 shows a side view of the ottoman of FIG. 1;

DETAILED DESCRIPTION

Figure 1:
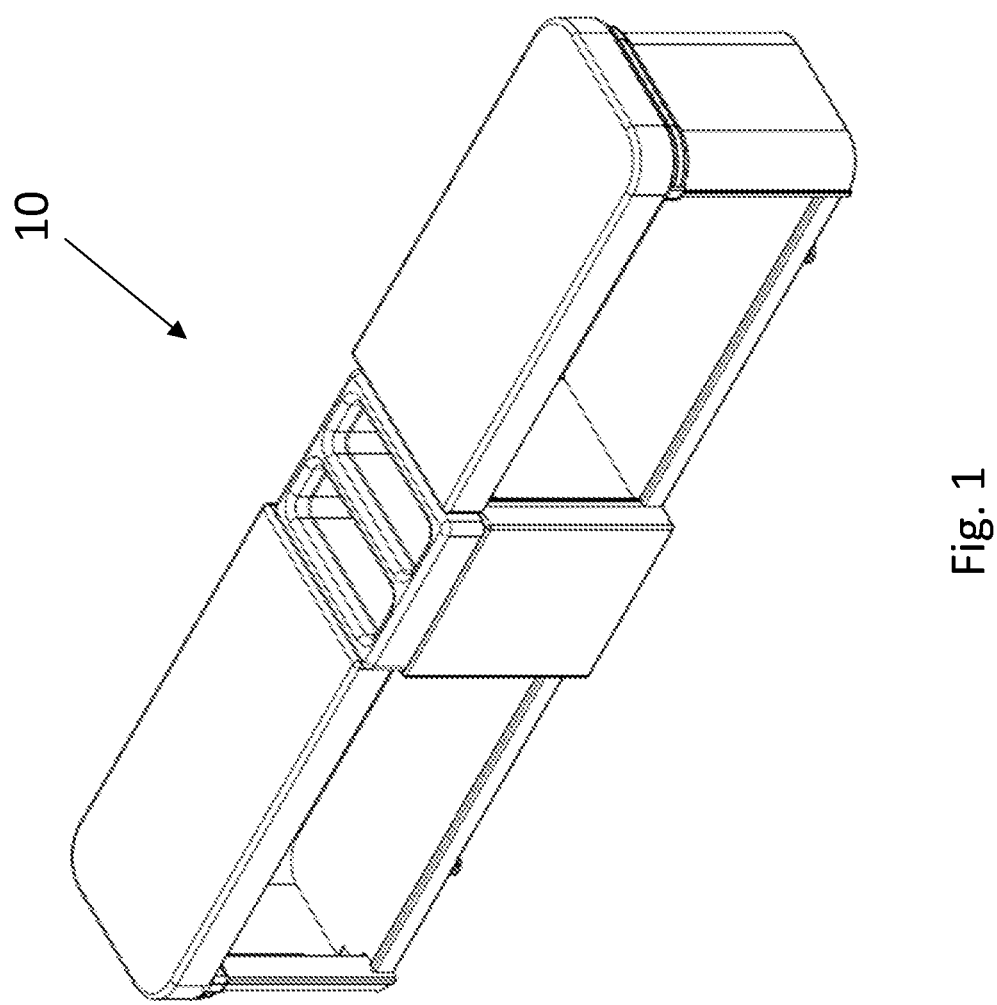
FIG. 1 shows an isometric view of an ottoman including a mounting structure according to a first embodiment of the invention.

FIGS. 1 to 5 show an ottoman 10 according to a first embodiment of the invention. The ottoman 10 is installed on an aircraft, along with an associated seat, pair, or triple of seats, a pair of seats as shown in FIG. 6. The ottoman 10 comprises a mounting structure 11, via which the ottoman 10 may be installed on an aircraft. The mounting structure 11 comprises a base plate 24 from which a first connection assembly 12 and second connection assembly 14 extend. The connection assemblies, 12, 14, each comprise a foot fitting 26, via which direct engagement with a mounting track 32 is made, and an adaptor 28, via which the foot fitting 26 is mounted to the base plate 24. Such an arrangement allows different foot fittings to be used depending on the mounting track configuration of an aircraft.

The first connection assembly 12 is associated with a first support 16 and third support 18. The first support 16 is fore of the connection assembly 12 and the third support 18 is aft of the first connection assembly. The fore and aft directions are relative to the line of flight LoF direction, as shown in FIG. 3. The second connection assembly 14 is associated with a second support 20 and fourth support 22. The second support 20 is fore of the second connection assembly 14 and the fourth support 22 is aft of the second connection assembly 14. The first connection assembly 12 and associated supports 16, 18, are located aligned with each other, and the second connection assembly 14 and associated supports 20, 22, are located aligned with each other, and each set of connection assembly and associated supports are aligned parallel to each other. The connection assemblies 12, 14, are located approximately midway between their respective supports 16, 18, 20, 22. In alternative embodiments, the connection assemblies may be located closer to one of the respective supports than the other. In a yet further alternative embodiment, only a single support may be provided associated with a connection assembly. In such an arrangement, the fore/aft positions of the connection assembly and respective support may be reversed from one connection assembly and respective support to the other. For example, the first connection assembly may be located towards the fore of an item of aircraft furniture, with the associated support located aft. The second connection assembly may be located towards the aft of the item of aircraft furniture, with the associated support located for.

In order to install the ottoman in an aircraft, the first connection assembly 12 and second connection assembly 14 are aligned with respective mounting tracks 32. The connection assemblies are then engaged with their respective mounting tracks in a conventional way, as would be well understood by a person skilled in the art. Once the connection assemblies are engaged with the mounting tracks, the associated supports will abut the respective mounting tracks. Therefore, when the aircraft accelerates, the third support 18 and fourth support 22 will be compressed, and reduce load on the connection assemblies 12, 14, and provide stability to the ottoman 10. When the aircraft decelerates, the first support 16 and second support 20 will be compressed, and reduce load on the connection assemblies 12, 14, and provide stability to the ottoman 10.

FIG. 3 shows the base plate 24, in this embodiment a composite structure, with a honeycomb core surrounded by a skin on either side. In alternative embodiments the base plate 24 may be a metal plate. The base plate comprises additional fittings 30 disposed laterally across the plate 24. The fittings 30 allow for the connection assemblies and supports to be located laterally closer or further apart from each other. Such an arrangement may allow a single base plate 24 to be used with mounting tracks of different spacings.

Figure 5:
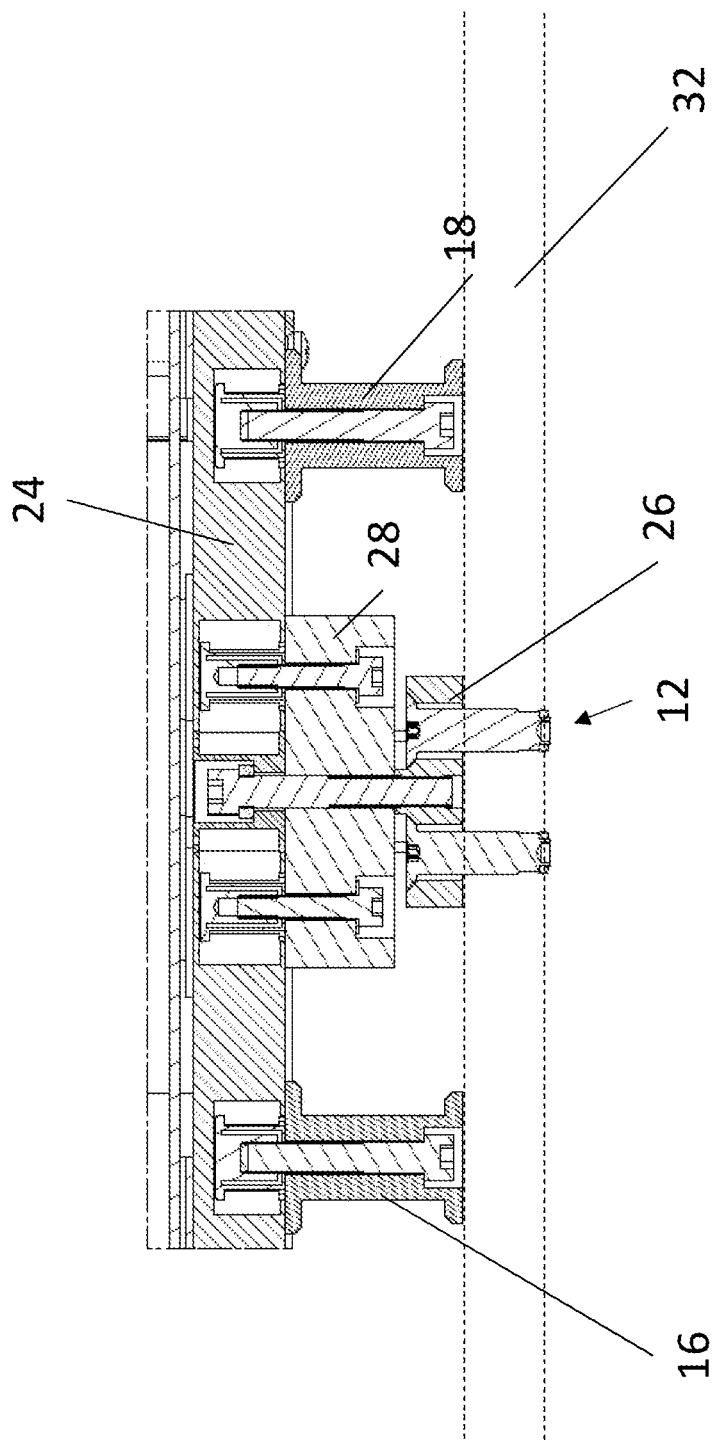
FIG. 5 shows a cross-sectional side view of the mounting structure.
Figure 6:
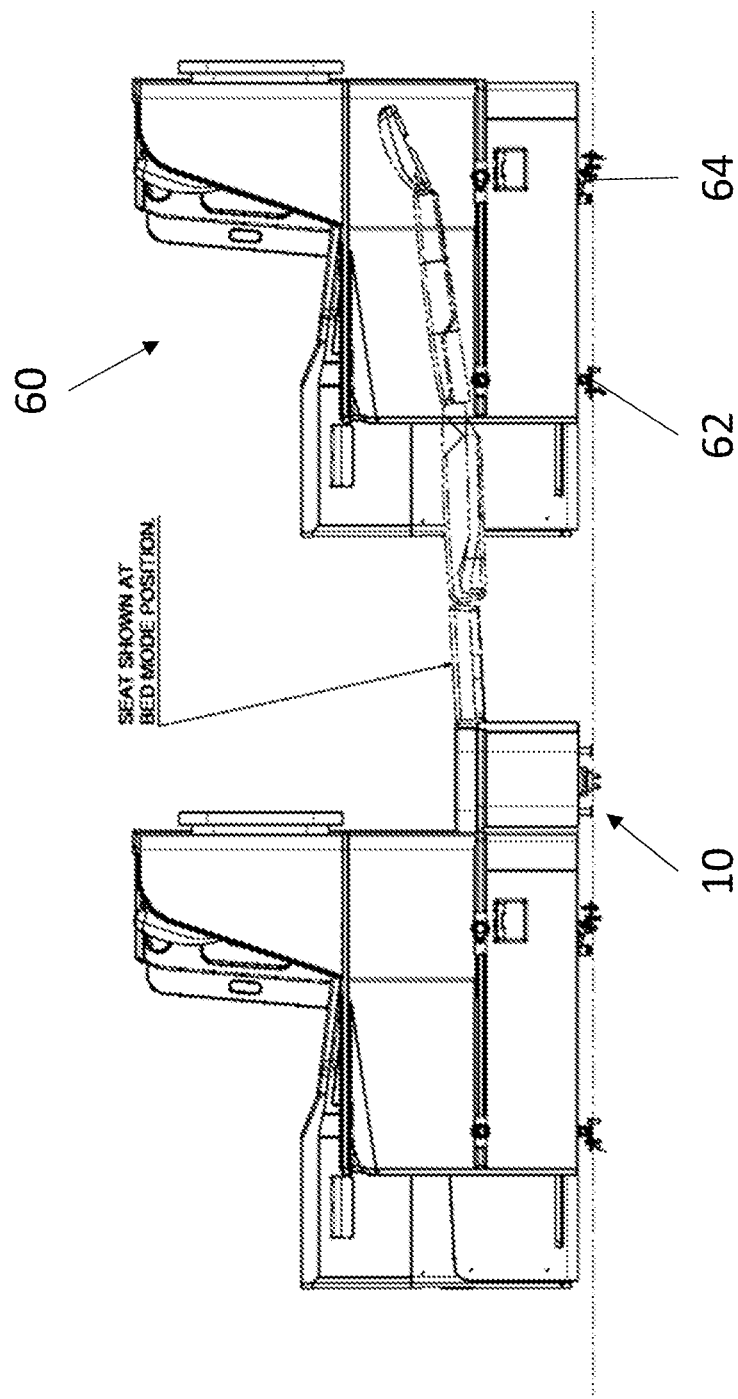
FIG. 6 shows a side view of the ottoman of FIG. 1 and an associated aircraft seat.

FIG. 5 shows the first connection assembly 12 which comprises a first part 26 and a second part 28. Such a connection assembly may be suitable for use on a Boeing 787 aircraft. The first part 26 is a foot fitting configured for attachment to a mounting track 32. The first part includes two fasteners, for example screws, which may extend into and be securely engaged to a mounting track. A further fastener is used to connect the first part 26 to the second part 28, which comprises a top plate. The top plate is securely engaged with the base plate 24 by a number of fasteners, for example screws. As can also be seen in FIG. 5, the first support 16 and third support 18 are securely engaged to the base plate 24 by fasteners, for example screws. The distal ends of the first support 16 and third support 18 are of greater cross-sectional area than the middle portion of the supports, both to spread any load exerted on the supports and also prevent the supports from being inserted into connection apertures in the mounting track. Instead, the supports abut the top of the mounting track to which the respective connection assembly is engaged. The skilled person will appreciate that the arrangement of the second connection assembly 14, second support 20, and fourth support 22, is the same on the other side of the ottoman 10. In an alternative arrangement, the first connection assembly 12 and second connection assembly 14 may each comprise a single unit, the single units configured both for engagement with a mounting track 32 and connection base plate 24.

FIG. 6 shows the ottoman 10 and an associated aircraft seat 60. In the figure, a first connection assembly 62 and second connection assembly 64 is shown connecting the aircraft seat 60 to an aircraft. However, in an alternative embodiment, a similar arrangement to the mounting structure of the ottoman 10 may be provided, with a single connection assembly per mounting track being provided with an associated support or supports which abut the mounting track.

Whilst the present invention has been described and illustrated with reference to particular embodiments, it will be appreciated by those of ordinary skill in the art that the invention lends itself to many different variations not specifically illustrated herein. For example, in an additional embodiment, the supports may be configured to abut the floor of an aircraft, rather than the mounting track with which the respective connection assemblies are engaged. In such an embodiment, the supports may comprise support pads to spread the loads transmitted into the aircraft floor. Such an arrangement may be particularly advantageous on smaller items of aircraft furniture, where the loads experienced by the supports would be expected to be less than for larger items of aircraft furniture. In an additional embodiment, the plate described above may be replaced by a framework from which the connection assemblies and supports extend.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A mounting structure for mounting an item of aircraft furniture in an aircraft, the mounting structure comprising:
   a first connection assembly configured for engagement with a first mounting track; and
   an associated first support separate to and distinct from the first connection assembly, the first support configured to abut the first mounting track at a location fore of the first connection assembly, wherein the first connection assembly is associated with a third support, the third support separate to and distinct from the first connection assembly, and the third support configured to abut the first mounting track at a location aft of the first connection assembly, wherein the mounting structure comprises a plate from which each of the first connection assembly, the first support, and the third support extend, wherein the plate is separate to and distinct from the first mounting track.

2. A mounting structure as claimed in claim 1, the mounting structure comprising a second connection assembly configured for connection with a second mounting track; and
   an associated second support separate to and distinct from the second connection assembly, the second support configured to abut the second mounting track at a location fore of the second connection assembly.

3. A mounting structure as claimed in claim 2, wherein the second connection assembly is associated with a fourth support, the fourth support separate to and distinct from the second connection assembly, and the fourth support configured to abut the second mounting track at a location aft of the second connection assembly.

4. A mounting structure as claimed in claim 1, wherein the supports comprise at least one of metal or polymer materials.

5. A mounting structure as claimed in claim 1, wherein the first support comprises at least one of a different structure or material to the third support.

6. A mounting structure as claimed in claim 1, wherein each support comprises a distal end which is configured to abut the first mounting track, the distal end shaped and sized such that it may not pass through the first mounting track.

7. A mounting structure as claimed in claim 1, wherein the plate comprises a plurality of apertures and engagement points from which the, or each, connection assembly and supports may extend.

8. A mounting structure as claimed in claim 1, wherein the, or each, connection assembly comprises a first part configured to be engaged with a mounting track, and a second part configured to adapt the first part for connection to the mounting structure.

9. A mounting structure as claimed in claim 1, wherein the mounting structure is part of the item of aircraft furniture.

10. A mounting structure as claimed in claim 9, wherein the item of aircraft furniture comprises an ottoman.

11. A mounting structure as claimed in claim 9, wherein the item of aircraft furniture comprises an aircraft seat.

12. A mounting structure as claimed in claim 9, wherein the item of aircraft furniture is part of an aircraft cabin.

13. A method of installing an item of aircraft furniture, wherein the item of aircraft furniture comprises a mounting structure comprising a first connection assembly configured for engagement with a first mounting track; and an associated first support separate to and distinct from the first connection assembly, the first support configured to abut the first mounting track at a location fore of the first connection assembly, wherein the first connection assembly is associated with a third support, the third support separate to and distinct from the first connection assembly, and the third support configured to abut the first mounting track at a location aft of the first connection assembly, wherein the mounting structure comprises a plate from which each of the first connection assembly, the first support, and the third support extend, wherein the plate is separate to and distinct from the first mounting track, the method comprising the steps of engaging the first connection assembly with a mounting track of an aircraft, such that the first support abuts the mounting track.

14. A mounting structure as claimed in claim 1, wherein the first connection assembly, the first support, and the third support are each positionable between the plate and the first mounting track.

* * * * *